US009283950B2

(12) United States Patent
Yamamoto et al.

(10) Patent No.: US 9,283,950 B2
(45) Date of Patent: Mar. 15, 2016

(54) DRIVE DEVICE FOR VEHICLE

(71) Applicant: HONDA MOTOR CO., LTD., Tokyo (JP)

(72) Inventors: Kazuhisa Yamamoto, Wako (JP); Shinsuke Ishii, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/548,580

(22) Filed: Nov. 20, 2014

(65) Prior Publication Data

US 2015/0151734 A1 Jun. 4, 2015

(30) Foreign Application Priority Data

Dec. 2, 2013 (JP) ................................ 2013-249273

(51) Int. Cl.

| | |
|---|---|
| ***B60W 10/06*** | (2006.01) |
| ***B60W 10/08*** | (2006.01) |
| ***B60W 10/113*** | (2012.01) |
| ***B60W 10/10*** | (2012.01) |
| ***B60K 6/48*** | (2007.10) |
| ***B60K 6/547*** | (2007.10) |

(52) U.S. Cl.

CPC .................. *B60W 10/10* (2013.01); *B60K 6/48* (2013.01); *B60K 6/547* (2013.01); *B60K 2006/4841* (2013.01); *Y10S 903/93* (2013.01); *Y10T 477/26* (2015.01)

(58) Field of Classification Search

None

See application file for complete search history.

(56) References Cited

U.S. PATENT DOCUMENTS

| | | | | |
|---|---|---|---|---|
| 2011/0073393 A1* | 3/2011 | Sasaki | .................... | B60K 6/387 180/65.22 |
| 2011/0269599 A1* | 11/2011 | Nakasako | ................ | B60K 6/36 477/5 |
| 2012/0240723 A1* | 9/2012 | Gluckler | .................. | B60K 6/36 74/661 |

FOREIGN PATENT DOCUMENTS

| | | |
|---|---|---|
| JP | 2008-302800 A | 12/2008 |

* cited by examiner

*Primary Examiner* — Edwin A Young

(74) *Attorney, Agent, or Firm* — Squire Patton Boggs (US) LLP

(57) ABSTRACT

A drive device for a vehicle, which is capable of improving reliability of an in-gear operation for switching a speed position to an in-gear state while ensuring the degree of freedom in design of the drive device and realizing reduction of manufacturing costs thereof. When a transmission condition for transmitting motive power of the engine to front wheels via a first-speed forward position is satisfied, the ECU controls a first speed synchronization mechanism such that the first-speed forward position is switched to the in-gear state. At this time, if a condition of output shaft rotational speed≥predetermined detection lower limit is satisfied, the ECU controls the rotational speed of the front motor such that a ring gear speed is reduced, whereas if the condition is not satisfied, the ECU controls the same to a predetermined synchronization assist value for suppressing the rotational speed difference.

6 Claims, 10 Drawing Sheets

F I G. 1
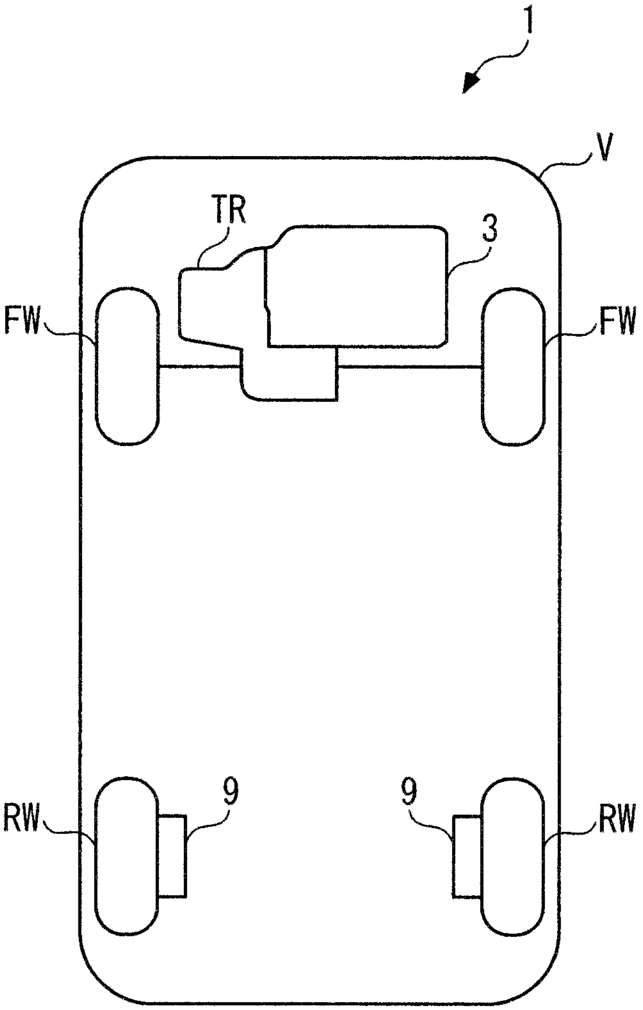

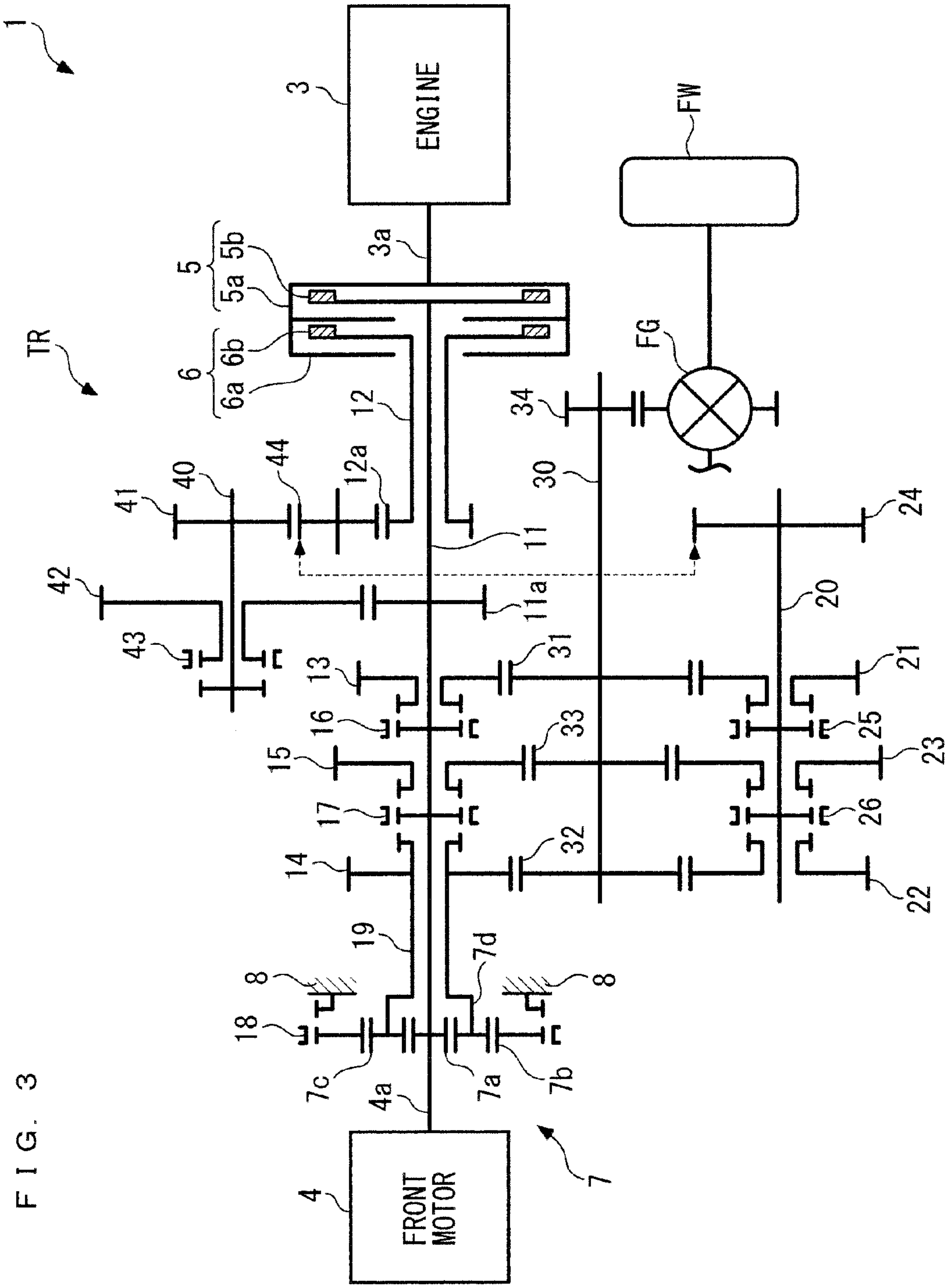
F I G. 3

F I G. 4
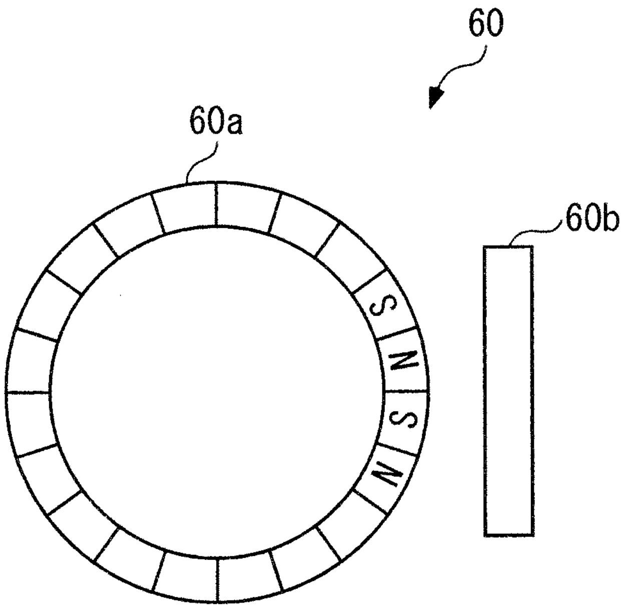

F I G. 6
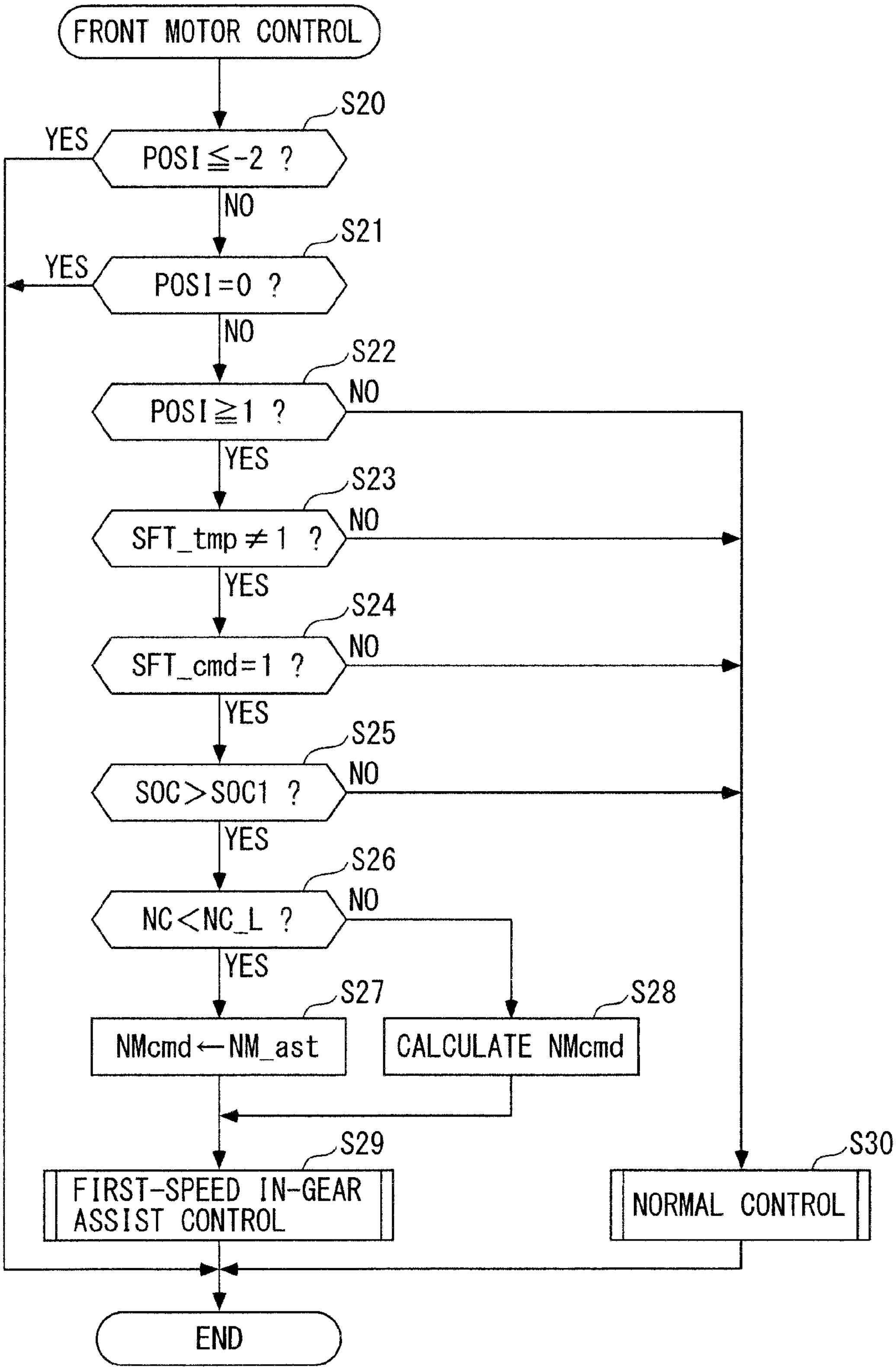

F I G. 7
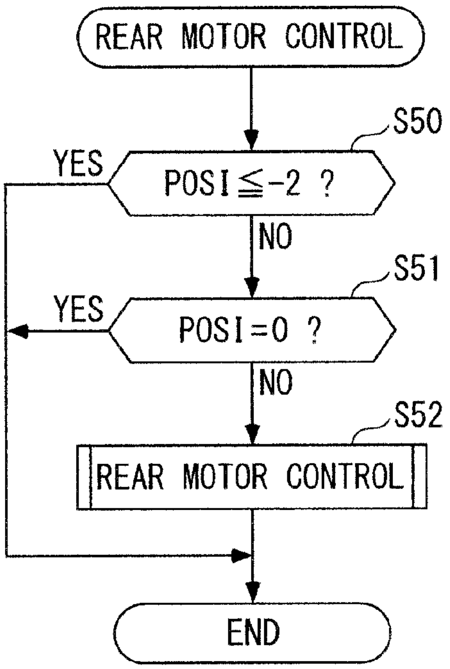
F I G. 8
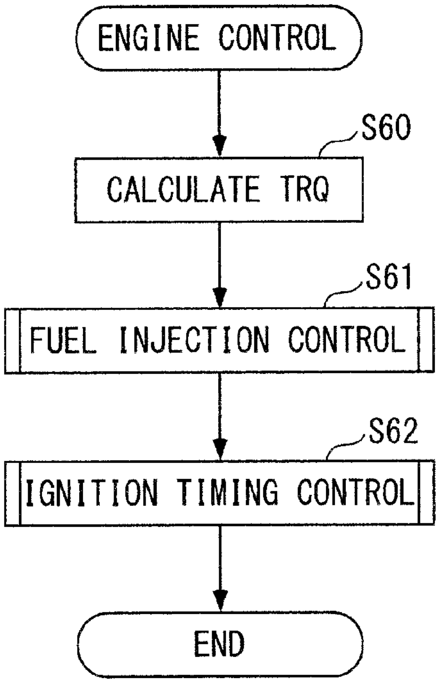

DRIVE DEVICE FOR VEHICLE

BACKGROUND OF THE INVENTION

1. Field of the Invention

The present invention relates to a drive device for a vehicle, which is installed on the vehicle and transmits motive powers from an internal combustion engine and an electric motor to driven parts while changing speeds of the motive powers.

2. Description of the Related Art

Conventionally, as a drive device for a vehicle, one disclosed in Japanese Laid-Open Patent Publication (Kokai) No. 2008-302800 is known. This drive device for a vehicle is applied to a four-wheel vehicle, and transmits motive powers of the engine and the electric motor to drive wheels while changing the speeds of the motive powers. The drive device includes an input shaft connected to the engine, an output shaft connected to the drive wheels, two counter shafts connected to the input shaft via two clutches, and so forth. A gear group forming a first-speed to sixth-speed forward positions, a synchronization mechanism for connecting and disconnecting the first-speed to sixth-speed forward positions, and an actuator for actuating the synchronization mechanism are arranged between the two counter shafts and the output shaft. Further, the electric motor is connected to a transmission gear for the first-speed forward position. Note that throughout the specification, the synchronization mechanism and the actuator for actuating the synchronization mechanism are collectively referred to as the “synchronizer”.

In the drive device for a vehicle, at the standing start of the vehicle, first, the first-speed forward position is switched to an in-gear state by the synchronizer. When the charge level of a battery is high enough, electric power of the battery is supplied to the electric motor, whereby the motive power of the electric motor is transmitted to the drive wheels via the first-speed forward position. On the other hand, when the charge level of the battery is not high enough, the motive power of the engine is transmitted to the drive wheels via the first-speed forward position.

According to the above-described conventional drive device for a vehicle, the electric motor is connected to the transmission gear for the first-speed forward position, and hence when the first-speed forward position is switched to the in-gear state at the standing start of the vehicle, there is a fear that an in-gear operation for switching the first-speed forward position to the in-gear state using the synchronizer fails, because the rotor of the electric motor acts as an inertial resistance. Although this problem can be solved by increasing the volume of the synchronization mechanism of the synchronizer or increasing the size of the actuator of the synchronizer, in a case where the synchronizer is configured as such, this is accompanied by an increase in the weight and size of the synchronizer, and accordingly such configuration brings about an increase in the manufacturing costs thereof and a lowered degree of freedom in design.

SUMMARY OF THE INVENTION

It is an object of the present invention to provide a drive device for a vehicle, which is capable of improving reliability of an in-gear operation for switching a speed position on a shaft having an electric motor connected thereto, to an in-gear state, while ensuring a degree of freedom in design of the drive device and realizing reduction of manufacturing costs thereof.

To attain the above object, the present invention provides a drive device for a vehicle, comprising an internal combustion engine and an electric motor installed on a vehicle as motive power sources, a first input shaft that is connected to the engine and the electric motor such that motive powers from the engine and the electric motor are transmitted thereto, a first clutch that connects and disconnects between the engine and the first input shaft, an output shaft that is connected to driven parts of the vehicle such that the motive powers can be transmitted to the driven parts, a first transmission gear group that is provided between the first input shaft and the output shaft, and forms a plurality of first speed positions, a first synchronizer that sets and unsets each of the plurality of first speed positions, by connecting two synchronization objects forming each of the plurality of first speed positions while synchronizing the two synchronization objects with each other, and releasing the connection between the two synchronization objects, a second input shaft that is different from the first input shaft and is connected to the engine such that a motive power from the engine is input thereto, a second transmission gear group that is provided between the second input shaft and the output shaft, and forms a plurality of second speed positions, a second synchronizer that sets and unsets each of the plurality of second speed positions, by connecting two synchronization objects forming each of the plurality of second speed positions while synchronizing the two synchronization objects with each other, and releasing the connection between the two synchronization objects, a second clutch that connects and disconnects between the engine and the second input shaft, first rotational speed-detecting means for detecting a rotational speed of the first input shaft as a first rotational speed, output rotational speed-detecting means for detecting a value indicative of a rotational speed of the output shaft as an output rotational speed, transmission control means for controlling the first clutch, the first synchronizer, the second clutch, and the second synchronizer, and controlling the first synchronizer such that the two synchronization objects of one of the plurality of first speed positions are connected to each other when a predetermined transmission condition is satisfied which is a condition for transmitting the motive power of the engine to the driven parts via the one first speed position, and electric motor control means for controlling, in a case where the predetermined transmission condition is satisfied, if the detected output rotational speed is not within a predetermined very low speed range, a rotational speed of the electric motor based on the detected first rotational speed and the detected output rotational speed such that a rotational speed difference between the two synchronization objects synchronized by the first synchronizer is reduced, and controlling, in the case where the predetermined transmission condition is satisfied, if the detected output rotational speed is within the predetermined very low speed range, the rotational speed of the electric motor to a predetermined speed for suppressing the rotational speed difference between the two synchronization object.

According to this drive device for a vehicle, the first clutch, the first synchronizer, the second clutch, and the second synchronizer are controlled, and the first synchronizer is controlled such that the two synchronization objects of one of the plurality of first speed positions are connected to each other when the predetermined transmission condition is satisfied which is a condition for transmitting the motive power of the engine to the driven parts via the one first speed position. Further, in the case where the predetermined transmission condition is satisfied, if the detected output rotational speed is not within the predetermined very low speed range, the rotational speed of the electric motor is controlled based on the detected first rotational speed and the detected output rotational speed such that the rotational speed difference between the two synchronization objects synchronized by the first synchronizer is reduced. By thus controlling the rotational speed of the electric motor, it is possible to reduce the rotational speed difference between the two synchronization objects, and hence if the output rotational speed is not within the predetermined very low speed range, it is possible to quickly and smoothly perform the in-gear operation for switching the one first speed position on the first input shaft having the electric motor connected thereto, to the in-gear state, while preventing a rotor of the electric motor from acting as an inertial resistance. In other words, it is possible to quickly and smoothly perform the in-gear operation for the first speed position without increasing the volume of a synchronization mechanism of the first synchronizer or increasing the size of an actuator of the first synchronizer. As a consequence, it is possible to improve the reliability of the in-gear operation for the one first speed position on the first input shaft having the electric motor connected thereto, while ensuring the degree of freedom in design of the drive device and realizing reduction of manufacturing costs thereof.

Further, when the rotational speed of the electric motor is controlled using the rotational speed-detecting means as described above, since resolution of the rotational speed-detecting means is limited, it can be erroneously determined that there occurs no rotational speed difference, although a rotational speed difference has occurred. In this case, since the electric motor is held in a stopped state, there is a possibility that this causes the rotor of the electric motor to act as an inertial resistance. On the other hand, according to this drive device, in the case where the predetermined transmission condition is satisfied, if the detected output rotational speed is within the predetermined very low speed range, the rotational speed of the electric motor is controlled to the predetermined speed for suppressing the rotational speed difference. Therefore, by setting the predetermined very low speed range to a range where the output rotational speed cannot be detected by the output rotational speed-detecting means due to the resolution of the output rotational speed-detecting means, it is possible to control the rotational speed of the electric motor to the predetermined speed for suppressing the rotational speed difference between the two synchronization objects, irrespective of whether or not a rotational speed difference has occurred. This makes it possible to prevent the rotor of the electric motor from acting as an inertial resistance even when the output rotational speed is within the range where the output rotational speed cannot be detected by the output rotational speed-detecting means, and under such a condition that a rotational speed difference occurs, it is possible to prevent occurrence of a rotational speed difference. As a consequence, it is possible to further improve the reliability of the in-gear operation for switching the one first speed position on the first input shaft having the electric motor connected thereto, to the in-gear state.

Preferably, the first transmission gear group forming the one first speed position includes a planetary gear unit, the output shaft and the electric motor are connected to the planetary gear unit such that the output rotational speed is located between the rotational speed of the electric motor and the rotational speed difference in a collinear chart representing a collinear relationship, and the predetermined speed is set to an intermediate value between a value defining an upper limit of the predetermined very low speed range of the output rotational speed and 0.

According to the preferred embodiment, the first transmission gear group forming the one first speed position includes the planetary gear unit, and the output shaft and the electric motor are connected to the planetary gear unit such that the output rotational speed is located between the rotational speed of the electric motor and the rotational speed difference in the collinear chart representing the collinear relationship. Therefore, under a condition in which the output rotational speed is not changed, if the rotational speed of the electric motor is increased, the rotational speed difference is reduced. However, with the configuration of this preferred embodiment, the predetermined speed is set to the intermediate value between the value for defining the upper limit of the predetermined very low speed range of the output rotational speed and 0, and therefore by controlling the rotational speed of the electric motor to the intermediate value, it is possible to make the rotational speed difference smaller than when the electric motor is in a stopped state, even under a condition that the output rotational speed is in the vicinity of the value defining the upper limit.

Preferably, the output rotational speed-detecting means includes a rotating body rotating in unison with the output shaft, a plurality of detected sections arranged at equally-spaced intervals on the rotating body, and a detecting section arranged in a vicinity of the rotating body, for detecting passing of each of the plurality of detected sections, wherein the predetermined very low speed range is set to a speed range in which the number of times of passing of each of the respective detected sections, detected by the detecting section, per predetermined unit time, is smaller than a predetermined value.

In general, in the case of rotational speed-detecting means of a type which detects passing of each of a plurality of detected sections arranged at equally-spaced intervals on the rotating body, resolution of the rotational speed-detecting means is limited due to the structure thereof, and there is a fear that the rotational speed of the electric motor cannot be detected within the very low speed range. Therefore, when a rotational speed difference within the very low speed range is calculated using results of detection by the rotational speed-detecting means configured as above, it is impossible to properly calculate the rotational speed difference. On the other hand, with the configuration of the preferred embodiment, the predetermined very low speed range is set to the speed range in which the number of times of passing of each of the respective detected sections, detected by the detecting section, per predetermined unit time, is smaller than the predetermined value, so that even when the output rotational speed is within the speed range where the output rotational speed cannot be detected by the output rotational speed-detecting means, it is possible to control the rotational speed of the electric motor to the predetermined speed for suppressing the rotational speed difference, whereby it is possible to quickly and smoothly perform the in-gear operation for switching the one first speed position on the first input shaft having the electric motor connected thereto, to the in-gear state, while preventing the rotor of the electric motor from acting as an inertial resistance. This makes it possible to improve the marketability of the vehicle.

Preferably, the one first speed position is set to a speed position for starting the vehicle.

With the configuration of the preferred embodiment, since the one first speed position is set to the speed position for starting the vehicle, the speed position for starting the vehicle, which requires acceleration responsiveness, can be positively switched to an in-gear state, whereby the vehicle can be caused to make a prompt standing start. This makes it possible to further improve the marketability of the vehicle.

Preferably, the predetermined transmission condition is a condition that transmission of the motive power from the engine to the driven parts should be performed by switching from any one of the plurality of second speed positions to the one first speed position.

With the configuration of the preferred embodiment, the predetermined transmission condition is that transmission of the motive power from the engine to the driven parts should be performed by switching from any one of the plurality of second speed positions to the one first speed position, and hence when an in-gear operation for switching one speed position to an in-gear state in advance, i.e. a pre-shift operation is performed in a state in which the motive power of the engine is transmitted to the driven parts via any one of the plurality of second speed positions, it is possible to smoothly and quickly perform the pre-shift operation.

Preferably, the driven parts are one of a set of front wheels and a set of rear wheels of the vehicle, the one first speed position is set to a speed position for starting the vehicle, and the predetermined transmission condition is that the speed position for starting the vehicle has been selected as a speed position with which the motive power of the engine should be transmitted, the drive device further comprising an other electric motor for driving the other of the set of front wheels and the set of rear wheels, and other electric motor control means for controlling the other electric motor such that the other set of wheels are driven at a standing start of the vehicle.

According to the preferred embodiment, since the one of the set of front wheels and the set of rear wheels can be driven by at least one of the engine and the electric motor, and the other of the set of front wheels and the set of rear wheels can be driven by the other electric motor, the vehicle is configured as an electric all-wheel drive vehicle. In the case of such a vehicle, in general, at the standing start of the vehicle in an all-wheel drive state, torque rise speed in the electric motor is considerably higher than in-gear speed of the speed position for starting the vehicle, set by the first synchronizer, so that the rotational speed difference between the two synchronization objects can be increased. However, with the configuration of this preferred embodiment, even under such a condition that the rotational speed difference between the two synchronization objects is liable to be increased, as in the case of the standing start of the vehicle in the all-wheel drive state, it is possible to suppress the rotational speed difference between the two synchronization objects, by controlling the electric motor, whereby it is possible to further improve the reliability of the in-gear operation for switching the speed position for starting the vehicle to an in-gear state.

The above and other objects, features, and advantages of the present invention will become more apparent from the following detailed description taken in conjunction with the accompanying drawings.

BRIEF DESCRIPTION OF THE DRAWINGS

FIG. 1 is a schematic diagram of a drive device for a vehicle, according to an embodiment of the present invention, and the vehicle to which the drive device is applied;

FIG. 3 is a schematic diagram of a front-wheel drive system of the drive device;

FIG. 4 is a schematic diagram of an output rotational speed sensor;

FIG. 6 is a flowchart of a front motor control process;

FIG. 7 is a flowchart of a rear motor control process;

FIG. 8 is a flowchart of an engine control process;

DETAILED DESCRIPTION OF PREFERRED EMBODIMENTS

Figure 2:
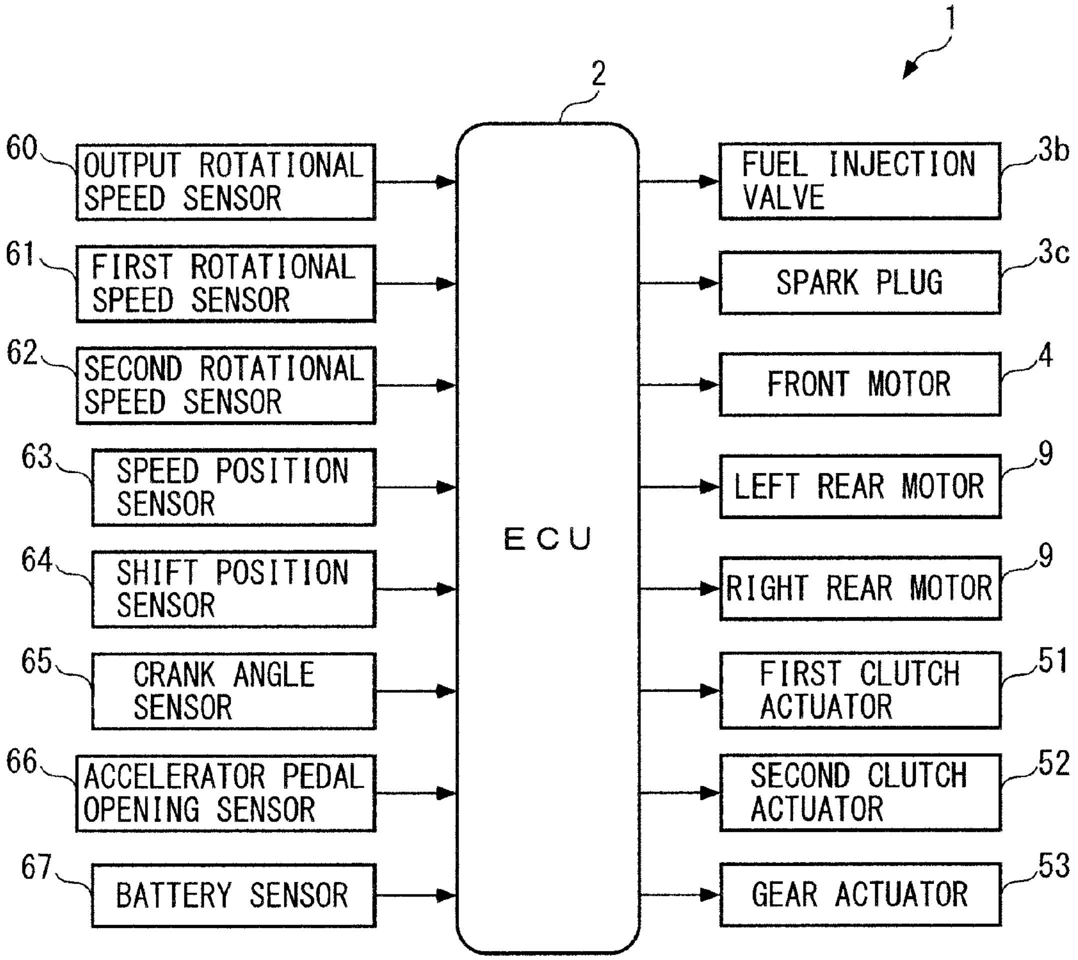
FIG. 2 is a block diagram of the electrical construction of the drive device.

Hereafter, a drive device for a vehicle, according to an embodiment of the invention, will be described with reference to drawings. As shown in FIG. 1, the drive device, denoted by reference numeral 1, according to the present embodiment is applied to a vehicle V. The vehicle V is comprised of an internal combustion engine (hereafter referred to as the "engine") 3 and a front motor 4 (see FIGS. 2 and 3) for driving left and right front wheels FW and FW, left and right rear motors 9 and 9 for driving left and right rear wheels RW and RW, and so forth.

In the vehicle V, the motive power of the engine 3 and/or the motive power of the front motor 4 are/is transmitted to the left and right front wheels FW and FW via an automatic transmission TR. Further, the left and right rear motors 9 and 9 are of an in-wheel motor type, and the left and right rear wheels RW and RW are directly driven by the left and right rear motors 9 and 9, respectively. That is, the vehicle V is configured as an electric all-wheel drive vehicle. Note that in the present embodiment, the front motor 4 corresponds to an electric motor, the front wheels FW and FW correspond to driven parts and one wheels, the rear wheels RW and RW correspond to the other wheels, and the rear motors 9 and 9 correspond to the other electric motors.

Further, the front motor 4 is a brushless DC motor. As shown in FIG. 2, the front motor 4 is electrically connected to an ECU 2, and the operating state thereof is controlled by the ECU 2, described hereinafter. Further, the left and right rear motors 9 and 9 as well are brushless DC motors. The left and right rear motors 9 and 9 are electrically connected to the ECU 2, and the operating states thereof are controlled by the ECU 2, described hereinafter.

On the other hand, the engine 3 includes a crankshaft 3*a* for outputting motive power (see FIG. 3), fuel injection valves 3*b* (only one of which is shown in FIG. 2) and spark plugs 3*c* (only one of which is shown in FIG. 3) provided for respective cylinders. As shown in FIG. 2, the fuel injection valves 3*b* and the spark plugs 3*c* are electrically connected to the ECU 2, and the operating states thereof are controlled by the ECU 2, whereby the operating state of the engine 3 is controlled.

Further, as shown in FIG. 3, the automatic transmission TR is a dual-clutch type automatic MT transmission, and is comprised of first and second clutches 5 and 6, a first input shaft 11, a second input shaft 21, an auxiliary shaft 20, an output shaft 30, and a reverse shaft 40, which are arranged in parallel with each other.

The first clutch 5 is a wet multiple-disc clutch, and includes a flywheel-type outer clutch plate 5*a* concentrically and integrally mounted on the crankshaft 3*a*, an inner clutch plate 5*b* concentrically and integrally mounted on one end of the first input shaft 11, a first clutch actuator 51 (see FIG. 2) for driving the inner clutch plate 5*b* toward the outer clutch plate 5*a*, and a return spring (not shown) which urges the inner clutch plate 5*b* such that the inner clutch plate 5*b* is moved away from the outer clutch plate 5*a*.

The first clutch actuator 51 is a combination of an electric motor (not shown) electrically connected to the ECU 2, and an oil pressure circuit (not shown) including an oil pressure cylinder driven by the electric motor. When a drive signal is supplied from the ECU 2, the first clutch actuator 51 drives the inner clutch plate 5*b* of the first clutch 5 toward the outer clutch plate 5*a* against the urging force of the return spring. The ECU 2 engages and disengages the first clutch 5 by controlling the first clutch actuator 51. In this case, when the first clutch is engaged, the motive power of the engine 3 is transmitted to the first input shaft 11 via the first clutch 5.

Further, the second clutch 6 is a wet multiple-disc clutch, similar to the first clutch 5, and includes an outer clutch plate 6*a* concentrically and integrally fixed to the outer clutch plate 5*a* of the first clutch 5, an inner clutch plate 6*b* integrally mounted on one end of a second input shaft 12, a second clutch actuator 52 (see FIG. 2) for driving the inner clutch plate 6*b* toward the outer clutch plate 6*a*, and a return spring (not shown) which urges the inner clutch plate 6*b* such that the inner clutch plate 6*b* is moved away from the outer clutch plate 6*a*.

The second clutch actuator 52 is constructed similarly to the above-described first clutch actuator 51. When a drive signal is supplied from the ECU 2, the second clutch actuator 52 drives the inner clutch plate 6*b* of the second clutch 6 toward the outer clutch plate 6*a* against the urging force of the return spring. The ECU 2 engages and disengages the second clutch 6 by controlling the second clutch actuator 52. In this case, when the second clutch 6 is engaged, the motive power of the engine 3 is transmitted to the second input shaft 12 via the second clutch 6.

On the other hand, the above-mentioned first input shaft 11 is rotatably supported by a transmission case 8 via bearings (not shown). The inner clutch plate 5*b* of the above-described first clutch 5 is fixed to one end of the first input shaft 11, and a sun gear 7*a* of a planetary gear unit 7, described hereinafter, is concentrically fixed to the other end thereof.

An input gear 11*a*, a third speed drive gear 13, a third speed synchronization mechanism 16, a seventh speed drive gear 15, a third-fifth speed synchronization mechanism 17, a fifth speed drive gear 14, a hollow cylindrical shaft 19, the planetary gear unit 7, and a first speed synchronization mechanism 18 are provided on the first input shaft 11 at respective locations in the mentioned order from a location toward the engine 3 to a location toward the front motor 4. These elements 7, 11*a*, and 13 to 19 are arranged concentrically with the first input shaft 11, and the input gear 11*a* is disposed in mesh with a reverse gear 42, referred to hereinafter. Note that in the present embodiment, the planetary gear unit 7 and the gears 13 to 15 correspond to first transmission gears, and the synchronization mechanisms 16 to 18 and a gear actuator 53 correspond to a first synchronizer.

A first rotational speed sensor 61 (first rotational speed-detecting means) is provided on the first input shaft 11. The first rotational speed sensor 61 is a combination of a magnet rotor (not shown) and an MRE pickup (not shown), and detects a first rotational speed N1, which is a rotational speed of the first input shaft 11, to deliver a signal indicative of the detected first rotational speed N1 to the ECU 2.

Further, the second input shaft 12, which is a hollow cylindrical shaft disposed concentrically with the first input shaft 11, has an inner hole thereof rotatably fitted on the first input shaft 11, and is rotatably supported by the transmission case 8 via bearings (not shown).

A second rotational speed sensor 62 is provided on the second input shaft 2. Similarly to the first rotational speed sensor 61, the second rotational speed sensor 62 is a combination of a magnet rotor (not shown) and an MRE pickup (not shown), and detects a second rotational speed N2, which is a rotational speed of the second input shaft 12, to deliver a signal indicative of the detected second rotational speed N2 to the ECU 2.

Further, the inner clutch plate 6*b* of the above-described second clutch 6 is concentrically mounted on one end of the second input shaft 12, and a gear 12*a* is concentrically mounted on the other end thereof. The gear 12*a* is in mesh with an idler gear 44.

On the other hand, the third speed drive gear 13 is rotatably provided on the first input shaft 11, and is in constant mesh with a second-third speed driven gear 31, referred to hereinafter, of the output shaft 30. A third-speed forward position is formed by the gears 13 and 31.

Further, the above-mentioned third speed synchronization mechanism 16, though detailed description thereof is omitted, is constructed similarly to a synchronization mechanism which the present applicant has proposed e.g. in the Publication of Japanese Patent No. 4242189, and is connected to the gear actuator 53 (see FIG. 2) via a third speed shift fork (not shown).

The gear actuator 53 is a combination of an electric motor, a gear mechanism electrically connected to the ECU 2, and so forth, and during the shift operation of the automatic transmission TR, drives the third speed synchronization mechanism 16 via the third speed shift fork under the control of the ECU 2. As a consequence, the third speed drive gear 13 is connected to or disconnected from the first input shaft 11, whereby the third-speed forward position is switched between an in-gear state and a neutral state.

Further, the seventh speed drive gear 15 is rotatably provided on the first input shaft 11, and is in constant mesh with a sixth-seventh speed driven gear 33, referred to hereinafter, of the output shaft 30. A seventh-speed forward position is formed by the gears 15 and 33. Furthermore, the fifth speed drive gear 14 is integrally formed on one end of the hollow cylindrical shaft 19 toward the engine 3, and is in constant mesh with a fourth-fifth speed driven gear 32, referred to hereinafter, of the output shaft 30. A fifth-speed forward position is formed by the gears 14 and 32.

On the other hand, the fifth-seventh speed synchronization mechanism 17 is constructed similarly to the aforementioned third speed synchronization mechanism 16, and is connected to the gear actuator 53 via a fifth-seventh speed shift fork (not shown). During the shift operation of the automatic transmission TR, the fifth-seventh speed synchronization mechanism 17 is driven by the gear actuator 53, whereby the fifth-speed and the seventh-speed forward positions are each switched between an in-gear state and a neutral state.

On the other hand, the above-mentioned planetary gear unit 7 is of a single planetary type, and includes the sun gear 7*a*, a ring gear 7*b* which is rotatably provided around an outer periphery of the planetary gear unit 7, and has a larger number of gear teeth than those of the sun gear 7*a*, a plurality of (e.g.

three) planetary gears 7*c* (only two of which are shown) in mesh with the gears 7*a* and 7*b*, and a rotatable carrier 7*d* rotatably supporting the planetary gears 7*c*.

The sun gear 7*a* is concentrically mounted on a rotating shaft 4*a* of the front motor 4. The rotating shaft 4*a* of the front motor 4 is coaxially and integrally formed with the first input shaft 11. With the above arrangement, the rotating shaft 4*a*, the sun gear 7*a*, and the first input shaft 11 rotate in unison with each other. Further, the carrier 7*d* is integrally and concentrically mounted on the hollow cylindrical shaft 19, and the ring gear 7*b* is provided with the above-mentioned first speed synchronization mechanism 18.

The first speed synchronization mechanism 18 is constructed similarly to the aforementioned third speed synchronization mechanism 16, and is connected to the gear actuator 53 via a first speed shift fork (not shown). During the shift operation of the automatic transmission TR, when a first-speed forward position is switched to an in-gear state, the ring gear 7*b* is connected to the transmission case 8 by driving the first speed synchronization mechanism 18 using the gear actuator 53, whereby the ring gear 7*b* is unrotatably held.

Further, when the first-speed forward position is switched to a neutral state, the ring gear 7*b* and the transmission case 8 are disconnected from each other by the first speed synchronization mechanism 18, whereby the rotation of the ring gear 7*b* is permitted. In this case, although the first speed synchronization mechanism 18 connects the ring gear 7*b* and the transmission case 8 with each while synchronizing them, since the transmission case 8 is unrotatable, the rotational speed difference between the two synchronization objects synchronized by the first speed synchronization mechanism 18 becomes equal to a rotational speed (hereinafter referred to as the "ring gear speed") NR1 of the ring gear 7*b*. Note that in the present embodiment, the ring gear 7*b* and the transmission case 8 correspond to the two synchronization objects.

With this arrangement, in the automatic transmission TR, when the first-speed forward position is switched to the in-gear state whereby the vehicle V travels with speed position set to the first-speed forward position, the motive power of the engine 3 and/or the motive power of the front motor are/is transmitted to the left and right front wheels FW and FW via the first clutch 5, the first input shaft 11, the planetary gear unit 7, the hollow cylindrical shaft 19, the fifth speed drive gear 14, the fourth-fifth speed driven gear 32, the output shaft 30, an output gear 34, and a final reduction gear box FG.

On the other hand, the aforementioned auxiliary shaft 20 is rotatably supported by the transmission case 8 via bearings (not shown). An input gear 24, a second speed drive gear 21, a second speed synchronization mechanism 25, a sixth speed drive gear 23, a fourth-sixth speed synchronization mechanism 26, and a fourth speed drive gear 22 are provided on the auxiliary shaft 20 at respective locations in the mentioned order from a location toward the engine 3 to a location toward the front motor 4. Note that in the present embodiment, the gears 21 to correspond to second transmission gears, and the synchronization mechanisms 25 and 26 and the gear actuator 53 correspond to a second synchronizer.

The input gear 24 is in mesh with the idler gear 44, and the idler gear 44 is in mesh with the gear 12*a* of the second input shaft 12, as mentioned above, whereby the auxiliary shaft 20 is connected to the second input shaft 12 via these gears 12*a*, 44, and 24.

Further, the second speed drive gear 21 is rotatably provided on the auxiliary shaft 20, and is in constant mesh with the second-third speed driven gear 31 of the output shaft 30. A second-speed forward position is formed by the gears 21 and 31.

Furthermore, the second speed synchronization mechanism 25 is connected to the above-described gear actuator 53 via a second speed shift fork (not shown). During the shift operation of the automatic transmission TR, the second speed synchronization mechanism 25 is driven by the gear actuator 53, whereby the second-speed forward position is switched between an in-gear state and a neutral state.

On the other hand, the sixth speed drive gear 23 is rotatably provided on the auxiliary shaft 20, and is in constant mesh with the sixth-seventh speed driven gear 33 of the output shaft 30. A sixth-speed forward position is formed by the gears 23 and 33. Further, the fourth speed drive gear 22 as well is rotatably provided on the auxiliary shaft 20, and is in constant mesh with the above-mentioned fourth-fifth speed driven gear 32. A fourth-speed forward position is formed by the gears 22 and 32.

Further, the fourth-sixth speed synchronization mechanism 26 is connected to the above-described gear actuator 53 via a fourth-sixth speed shift fork (not shown). During the shift operation of the automatic transmission TR, the fourth-sixth speed synchronization mechanism 26 is driven by the gear actuator 53, whereby the fourth-speed and sixth-speed forward positions are each switched between an in-gear state and a neutral state.

Furthermore, the output shaft 30 is rotatably supported by the transmission case 8 via bearings (not shown). The output gear 34, the second-third speed driven gear 31, the sixth-seventh speed driven gear 33, and the fourth-fifth speed driven gear 32 are arranged on the output shaft 30 at respective locations in the mentioned order from a location toward the engine 3 to a location toward the front motor 4. The four gears 31 to 34 are each concentrically fixed to the output shaft 30. Note that in the present embodiment, the gears 31 to 33 correspond to the first transmission gears and the second transmission gears.

On the other hand, as described hereinabove, the second-third speed driven gear 31 is in mesh with the second speed drive gear 21 and the third speed drive gear 13, the sixth-seventh speed driven gear 33 is in mesh with the sixth speed drive gear 23 and the seventh speed drive gear 15, and the fourth-fifth speed driven gear 32 is in mesh with the fourth speed drive gear 22 and the fifth speed drive gear 14. Further, the output gear 34 is in constant mesh with the final reduction gear box FG, whereby the rotation of the output shaft 30 is transmitted to the left and right front wheels FW and FW via the final reduction gear box FG.

Further, an output rotational speed sensor 60 is provided on the output shaft 30, and is electrically connected to the ECU 2 (see FIG. 2). As shown in FIG. 4, the output rotational speed sensor 60 is a combination of a magnet rotor 60*a* and an MRE pickup 60*b*. The magnet rotor 60*a* is concentrically mounted on the output shaft 30 such that it rotates in unison with the output shaft 30. N poles and S poles are circumferentially alternately arranged at equally-spaced intervals on an outer peripheral surface of the magnet rotor 60*a*.

On the other hand, the MRE pickup 60*b* delivers a pulse signal during rotation of the magnet rotor 60*a*, in accordance with a change in a magnetic field in the vicinity of the MRE pickup 60*b*. The ECU 2 calculates an output rotational speed NC, which is the rotational speed of the output shaft 30, a vehicle speed VP, which is the speed of the vehicle V, and so forth, based on the pulse signal from the output rotational speed sensor 60. At this time, the ECU 2 calculates the output rotational speed NC as 0 when the output rotational speed NC is in a very low speed range in which the output rotational speed NC is lower than a predetermined detection lower limit value NC_L, due to the resolution of the output rotational speed sensor 60. The very low speed range is set to such a range that the number of times of generation of the pulse signal by the output rotational speed sensor 60 per predetermined unit time (e.g. several hundreds of msec) is not larger than a predetermined value (e.g. 2).

Note that in the present embodiment, the output rotational speed sensor 60 corresponds to output rotational speed-detecting means, the magnet rotor 60*a* corresponds to a rotating body, the N pole and the S pole correspond to detected sections, the MRE pickup 60*b* corresponds to a detecting section, and the predetermined detection lower limit value NC_L corresponds to a value for defining the upper limit of the predetermined very low speed range.

A reverse input gear 41, the reverse gear 42, and a reverse synchronization mechanism 43 are provided on the reverse shaft 40 at respective locations in the mentioned order from a location toward the engine 3 to a location toward the front motor 4. The reverse input gear 41 is coaxially fixed to the reverse shaft 40, and is in mesh with the above-mentioned idler gear 44. The reverse gear 42 is rotatably provided on the reverse shaft 40, and is in mesh with the above-mentioned input gear 11*a* of the first input shaft 11.

Furthermore, the reverse synchronization mechanism 43 is constructed similarly to the above-mentioned third speed synchronization mechanism 16, and is connected to the gear actuator 53 via a reverse shift fork (not shown). During the shift operation of the automatic transmission TR to cause the vehicle V to travel backward, the reverse synchronization mechanism 43 is driven by the gear actuator 53, whereby the reverse gear 42 is connected to the reverse shaft 40, as described hereinafter. Further, when a backward travel position is switched to the neutral state, the reverse gear 42 and the reverse shaft 40 are disconnected from each other by the reverse synchronization mechanism 43.

A speed position sensor 63 (see FIG. 2) is disposed close to the gear actuator 53. The speed position sensor 63 detects an operating state of the gear actuator 53, and delivers a signal indicative of the detected operating state of the gear actuator 53 to the ECU 2.

On the other hand, the vehicle V is provided with a shift lever device and an accelerator pedal (neither of which is shown). The shift lever device is of a floor shift lever type, and is provided with five positions, i.e. a parking position, a reverse position, a neutral position, a drive position, and a sport position, as shift positions, whereby the shift lever device is configured such that the shift position thereof can be switched and selected between the five positions according to a shift operation by a driver.

The shift lever device is provided with a shift position sensor 64 (see FIG. 2). The shift position sensor 64 detects which of the five shift positions is selected in the shift lever device, and delivers a signal indicative of the detected shift position to the ECU 2.

Further, as illustrated in FIG. 2, a crank angle sensor 65, an accelerator pedal opening sensor 66, and a battery sensor 67 are connected to the ECU 2. The crank angle sensor 65 delivers a CRK signal, which is a pulse signal, to the ECU 2 along with rotation of the crankshaft 3*a*. Each pulse of the CRK signal is generated whenever the crankshaft 3*a* rotates through a predetermined crank angle (e.g. 1°). The ECU 2 calculates a rotational speed NE of the engine 3 (hereafter referred to as the "engine speed NE") based on the CRK signal.

Further, the accelerator pedal opening sensor 66 detects a stepped-on amount AP of the accelerator pedal (hereinafter referred to as the "accelerator pedal opening AP"), and delivers a signal indicative of the detected accelerator pedal opening AP to the ECU 2.

On the other hand, the battery sensor 67 detects values of current and voltage input to and output from a battery (not shown), and delivers signals indicative of the detected current and voltage values to the ECU 2 The ECU 2 calculates the amount of electric power accumulated in the battery, i.e. a charge level SOC of the battery based on the detection signals from the battery sensor 67.

The ECU 2 is implemented by a microcomputer comprised of a CPU, a RAM, a ROM, and an I/O interface (none of which are shown), and executes various control processes, such as a transmission control process, a front motor control process, and a rear motor control process, based on the detection signals from the aforementioned sensors 60 to 67, as described hereinafter. Note that in the present embodiment, the ECU 2 corresponds to transmission control means, electric motor control means, and other electric motor control means.

Hereafter, the transmission control process will be described with reference to FIG. 5. The transmission control process controls the engaged/disengaged states of the first and second clutches 5 and 6, and the in-gear/neutral states of the first-speed to seventh-speed forward positions and the backward travel position, by driving the above-described three actuators 51 to 53, and is performed by the ECU 2 at a predetermined control period ΔT (e.g. 10 msec).

Figure 5:
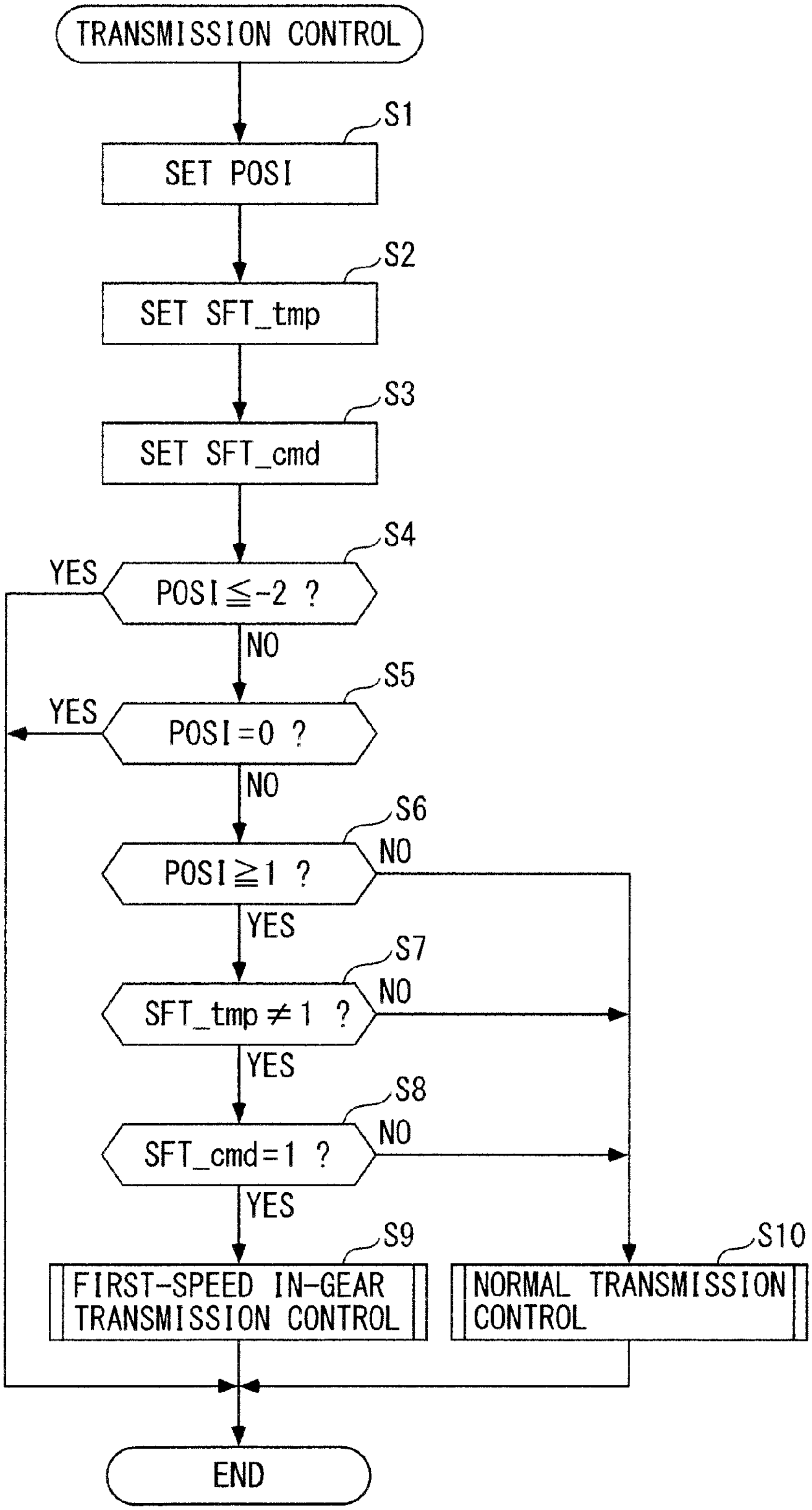
FIG. 5 is a flowchart of a transmission control process.

As shown in FIG. 5, first, in a step 1 (shown as S1 in abbreviated form in FIG. 5; the following steps are also shown in abbreviated form), a shift position value POSI is set based on the detection signal from the shift position sensor 64, as described hereinafter.

Specifically, the shift position value POSI is set to −2 when the shift position is set to the parking position, to −1 when the same is set to the reverse position, to 0 when the same is set to the neutral position, to 1 when the same is set to the drive position, and to 2 when the same is set to the sport position. Further, when the shift position is in a no position state (state in which the shift position cannot be identified since the shift lever is between shift positions), the shift position value POSI is set to −3.

Next, the process proceeds to a step 2, wherein a current speed position value SFT_tmp is set based on the detection signal from the speed position sensor 63.

Specifically, the current speed position value SFT_tmp is set to −1 when the current speed position is set to the backward travel position, to 0 when all the speed positions are currently not in the in-gear states but in the neutral states, and to one of 1 to 7 when the current speed position is set to an associated one of the first-speed to seventh-speed forward positions.

Then, in a step 3, a target speed position value SFT_cmd is set. The target speed position value SFT_cmd represents the value of a speed position as a target (hereinafter referred to as "the target speed position"), and is set, as described hereinafter, by searching a map (not shown) according to operating parameters, such as the shift position value POSI, a demanded torque TRQ, referred to hereinafter, the engine speed NE, and the vehicle speed VP.

That is, the target speed position value SFT_cmd is set to −1 when the target speed position is set to the backward travel position, to 0 when the same is in the neutral state, and to one of 1 to 7 when the same is set to an associated one of the first-speed to seventh-speed forward positions.

Then, the process proceeds to a step 4, wherein it is determined whether or not the shift position value POSI≤−2 holds.

If the answer to this question is affirmative (YES), i.e. if the shift position is set to the parking position or is in the no position state, the present process is immediately terminated.

On the other hand, if the answer to the question of the step 4 is negative (NO), the process proceeds to a step 5, wherein it is determined whether or not the shift position value POSI=0 holds. If the answer to this question is affirmative (YES), i.e. if the shift position is set to the neutral position, the present process is immediately terminated.

On the other hand, if the answer to the question of the step 5 is negative (NO), the process proceeds to a step 6, wherein it is determined whether or not the shift position value POSI≥1 holds. If the answer to this question is affirmative (YES), i.e. if the shift position is set to the drive position or the sport position, the process proceeds to a step 7, wherein it is determined whether or not the current speed position value SFT_tmp≠1 holds.

If the answer to this question is affirmative (YES), i.e. if the current speed position is not set to the first-speed forward position, the process proceeds to a step 8, wherein it is determined whether or not the target speed position value SFT_cmd=1 holds. If the answer to this question is affirmative (YES), it is determined that a condition that the first-speed forward position should be switched to the in-gear state (predetermined transmission condition) is satisfied, and the process proceeds to a step 9, wherein a first-speed in-gear transmission control process is performed.

In this first-speed in-gear transmission control process, the first speed synchronization mechanism 18 is driven in a state in which the first clutch 5 is held in the disengaged state, whereby the first-speed forward position is switched to the in-gear state, and then the first clutch 5 is engaged. In doing this, when the second clutch 6 is in an engaged state, the second clutch 6 is disengaged while causing the first clutch 5 to be engaged. After thus performing the first-speed in-gear transmission control process in the step 9, the present process is terminated.

On the other hand, if any one of the answers to the questions of the steps 6 to 8 is negative (NO), a normal transmission control process is performed in a step 10. In this normal transmission control process, the engaged/disengaged state of each of the first and second clutches 5 and 6, and the in-gear/neutral state of each of the first-speed to seventh-speed forward positions and the backward travel position is controlled based on the shift position value POSI, the current speed position value SFT_tmp, and the target speed position value SFT_cmd. After thus performing the normal transmission control process in the step 10, the present process is terminated.

Next, the front motor control process will be described with reference to FIG. 6. This control process controls the operating state of the front motor 4, and is performed by the CPU 2 at the above-described control period ΔT.

Referring to FIG. 6, first, in a step 20, it is determined whether or not the shift position value POSI≤−2 holds. If the answer to this question is affirmative (YES), i.e. if the shift position is set to the parking position or is in the no position state, the present process is immediately terminated.

On the other hand, if the answer to the question of the step 20 is negative (NO), the process proceeds to a step 21, wherein it is determined whether or not the shift position value POSI=0 holds. If the answer to this question is affirmative (YES), i.e. if the shift position is set to the neutral position, the present process is immediately terminated.

On the other hand, if the answer to the question of the step 21 is negative (NO), the process proceeds to a step 22, wherein it is determined whether or not the shift position value POSI≥1 holds. If the answer to this question is affirmative (YES), i.e. if the shift position is set to the drive position or the sport position, the process proceeds to a step 23, wherein it is determined whether or not the current speed position value SFT_tmp≠1 holds.

If the answer to this question is affirmative (YES), i.e. if the current speed position is not set to the first-speed forward position, the process proceeds to a step 24, wherein it is determined whether or not the target speed position value SFT_cmd=1 holds. If the answer to this question is affirmative (YES), the process proceeds to a step 25, wherein it is determined whether or not the charge level SOC is larger than a predetermined value SOC1.

If the answer to this question is affirmative (YES), it is judged that the charge level SOC is high enough to drive the front motor 4, and the process proceeds to a step 26, wherein it is determined whether or not the output rotational speed NC is lower than the above-mentioned predetermined detection lower limit value NC_L. If the answer to this question is affirmative (YES), i.e. if the output rotational speed NC is within the very low speed range, the process proceeds to a step 27, wherein a target rotational speed NMcmd is set to a predetermined synchronization assist value NM_ast. The predetermined synchronization assist value NM_ast is set to a value equal to one half of the detection lower limit value NC_L (=NC_L/2), for a reason described hereinafter.

On the other hand, if the answer to the question of the step 26 is negative (NO), i.e. if the output rotational speed NC is not within the very low speed range, the process proceeds to a step 28, wherein the target rotational speed NMcmd is calculated by searching a map (not shown) according to the first rotational speed N1 and the output rotational speed NC. In this case, the target rotational speed NMcmd is set to such a value as will make it possible to reduce the ring gear speed NR1, i.e. the rotational speed difference between the two synchronization objects synchronized by the first speed synchronization mechanism 18.

In a step 29 following the above-described step 27 or 28, a first-speed in-gear assist control process is performed. In this control process, electric power supplied to the front motor 4 is controlled such that a rotational speed NM of the front motor 4 (hereafter referred to as the “motor rotational speed NM”) becomes equal to the above-mentioned target rotational speed NMcmd, in order to assist an in-gear operation for switching the first-speed forward position to the in-gear state by the first speed synchronization mechanism 18. As a consequence, as described hereinafter, it is possible to reduce a degree of inertial resistance caused by the rotor of the front motor 4, when the gear actuator 53 drives the first speed synchronization mechanism 18. After thus performing the first-speed in-gear assist control process in the step 29, the present process is terminated.

On the other hand, if any of the answers to the questions of the steps 22 to 25 is negative (NO), a normal control process is performed in a step 30. In this normal control process, the powering control, electric power regeneration control, zero torque control, and so forth of the electric motor 4 are performed based on the charge level SOC, the vehicle speed VP, the demanded torque TRQ, the shift position value POSI, the current speed position value SFT_tmp, and so forth. After thus performing the normal control process in the step 30, the present process is terminated.

Next, the rear motor control process will be described with reference to FIG. 7. This control process controls the operating states of the rear motors 9 and 9, and is performed by the CPU 2 at the above-described control period ΔT.

Referring to FIG. 7, first, in a step 50, it is determined whether or not the shift position value POSI≤−2 holds. If the answer to this question is affirmative (YES), i.e. if the shift position is set to the parking position or is in the no position state, the present process is immediately terminated.

On the other hand, if the answer to the question of the step 50 is negative (NO), the process proceeds to a step 51, wherein it is determined whether or not the shift position value POSI=0 holds. If the answer to this question is affirmative (YES), i.e. if the shift position is set to the neutral position, the present process is immediately terminated.

On the other hand, if the answer to the question of the step 51 is negative (NO), the process proceeds to a step 52, wherein the rear motor control process is performed. In this control process, the powering control, o electric power regeneration control, zero torque control, and so forth of the rear motors 9 and 9 are performed based on the charge level SOC, the vehicle speed VP, the demanded torque TRQ, the shift position value POSI, the current speed position value SFT_tmp, and so forth.

In this case, as will be described hereinafter, when idling stop conditions are satisfied during stoppage of the vehicle V, idling stop control of the engine 3 is performed, and hence, at the standing start of the vehicle V, if the charge level SOC has a value high enough to drive the front motor 4, in order to improve fuel economy, the powering control of the rear motors 9 and 9 is performed in a stopped state of the engine 3. This causes the vehicle V to be started as an electric vehicle using only the motive power from the rear motors 9 and 9. After thus performing the rear motor control process in the step 50, the present process is terminated.

Next, an engine control process will be described with reference to FIG. 8. This control process controls the operating state of the engine 3, and is performed by the ECU 2 in synchronism with generation of the TDC signal.

Referring to FIG. 8, first, in a step 60, the demanded torque TRQ is calculated. Specifically, when none of a set of starting conditions, a set of restarting conditions, and a set of idling stop conditions are satisfied, the demanded torque TRQ is calculated by searching a map (not shown) according to the accelerator pedal opening AP and the engine speed NE. On the other hand, when the idling stop conditions are satisfied, the demanded torque TRQ is calculated as 0. Further, when the starting conditions or the restarting conditions are satisfied, the demanded torque TRQ is set to an optimum value for starting or restarting the engine 3.

After the demanded torque TRQ is thus calculated in the step 60, the process proceeds to a step 61, wherein a fuel injection control process is performed. In this control process, when none of the set of starting conditions, the set of restarting conditions, and the set of idling stop conditions are satisfied, a fuel injection amount is calculated by searching a map (not shown) according to the demanded torque TRQ, and fuel injection timing is calculated according to the fuel injection amount and the engine speed NE, whereby fuel injection by the fuel injection valve 3*b* is executed based on the calculated fuel injection amount and fuel injection timing.

On the other hand, when the idling stop conditions are satisfied, the fuel injection amount is calculated as 0, whereby the fuel injection by the fuel injection valve 3*b* is stopped. Further, when the starting conditions or the restarting conditions are satisfied, the fuel injection amount and the fuel injection timing are set to optimum values for starting or restarting the engine 3.

After thus performing the fuel injection control process in the step 61, the process proceeds to a step 62, wherein an ignition timing control process is performed. In this control process, when none of the set of starting conditions, the set of restarting conditions, and the set of idling stop conditions are satisfied, ignition timing is calculated by searching a map (not shown) according to the fuel injection amount, the fuel injection timing, the engine speed NE, and so forth. By using the calculated ignition timing, ignition of a mixture is executed by the spark plug 3*c*. On the other hand, when the idling stop conditions are satisfied, the ignition by the spark plug 3*c* is stopped. Further, when the starting conditions or the restarting conditions are satisfied, ignition of a mixture by the spark plug 3*c* is executed in optimum timing for starting or restarting the engine 3.

After thus execution of the ignition timing control process in the step 62, the present process is terminated.

In the case of the drive device 1 according to the present embodiment, since the various control processes are performed as described above, the idling stop control for stopping the engine 3 is performed during stoppage of the vehicle V. Further, at the standing start of the vehicle V, if the charge level SOC is high enough to drive the front motor 4, the motive power of the rear motors 9 and 9 is transmitted to the rear wheels RW and RW in the stopped state of the engine 3.

On the other hand, if the charge level SOC is not high enough to drive the front motor 4, the motive power of the engine 3 is transmitted to the front wheels FW and FW, by stopping driving of the rear motors 9 and 9, starting the engine 3 using a starter, not shown, (or the front motor 4), and switching the first-speed forward position to the in-gear state by the first speed synchronization mechanism 18. Further, at the standing start of the vehicle V, when the accelerator pedal is suddenly stepped on, to quickly start the vehicle V, the motive power of the rear motors 9 and 9 is transmitted to the rear wheels RW and RW, and the motive power of the engine 3 is transmitted to the front wheels FW and FW by starting the engine 3 and switching the first-speed forward position to the in-gear state by the first speed synchronization mechanism 18.

Further, in the case where the first-speed forward position is switched to the in-gear state by the first speed synchronization mechanism 18, when the output rotational speed NC is within the very low speed range, the rotational speed of the front motor 4 is controlled in the FIG. 6 front motor control process such that it becomes equal to the predetermined synchronization assist value NM_ast, as described above. Hereinafter, the reason why such a control method is employed will be described with reference to FIGS. 9 to 12.

The drive device 1 according to the present embodiment is configured such that in switching the first-speed forward position of the automatic transmission TR to the in-gear state, the ring gear 7*b* of the planetary gear unit 7 and the transmission case 8 are connected while being synchronized with each other by the first speed synchronization mechanism 18. In this case, the rotational speed of the transmission case 8 is 0, as described above, and hence the rotational speed difference between the two synchronization objects synchronized by the first speed synchronization mechanism 18 becomes equal to the ring gear speed NR1.

Further, in the state in which the first-speed forward position is thus switched to the in-gear state, the rotation of the first input shaft 11 is transmitted to the output shaft 30 via the carrier 7*d* of the planetary gear unit 7, the fifth speed drive gear 14, and the fourth-fifth speed driven gear 32.

With this arrangement, the motor rotational speed NM, the output rotational speed NC, and the ring gear speed NR1 are in the collinear relationship with each other, and are located on the same straight line. Therefore, e.g. when the vehicle V is in the stopped state, and the shift position is set to the parking position or the neutral position, the first clutch 5 is held in the disengaged state, and the front motor 4 is held in a stopped state, whereby as shown in FIG. 9, the motor rotational speed NM, the output rotational speed NC, and the ring gear speed NR1 all become equal to 0.

Figure 9:
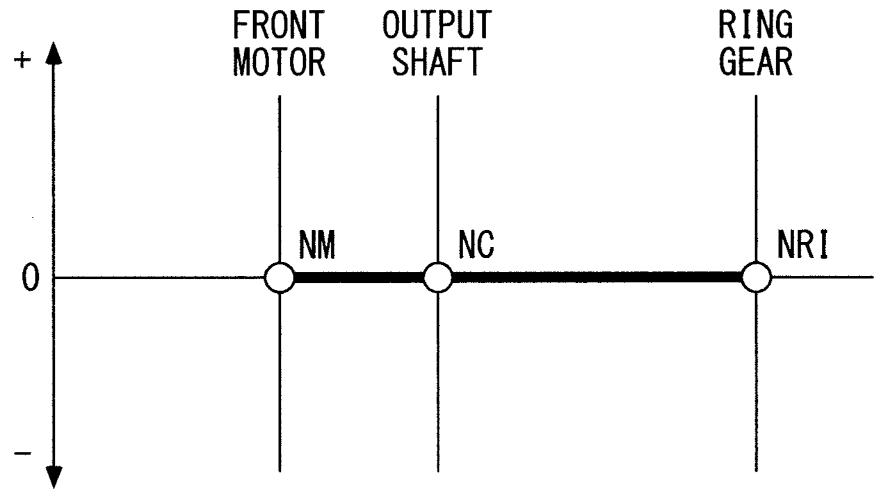
FIG. 9 is a collinear chart illustrating a relationship between a motor rotational speed, an output rotational speed, and a ring gear speed, occurring when the vehicle and a front motor are in a stopped state.

From the FIG. 9 state, e.g. when the shift position is switched to the drive position or the sport position, and the accelerator pedal is simultaneously suddenly stepped on, the demanded torque TRQ suddenly increases to quickly start the vehicle V, whereby the rear motors 9 and 9 are driven, and at the same time, in order to transmit the motive power of the engine 3, the in-gear operation for switching the first-speed forward position to the in-gear state is performed.

Figure 10:
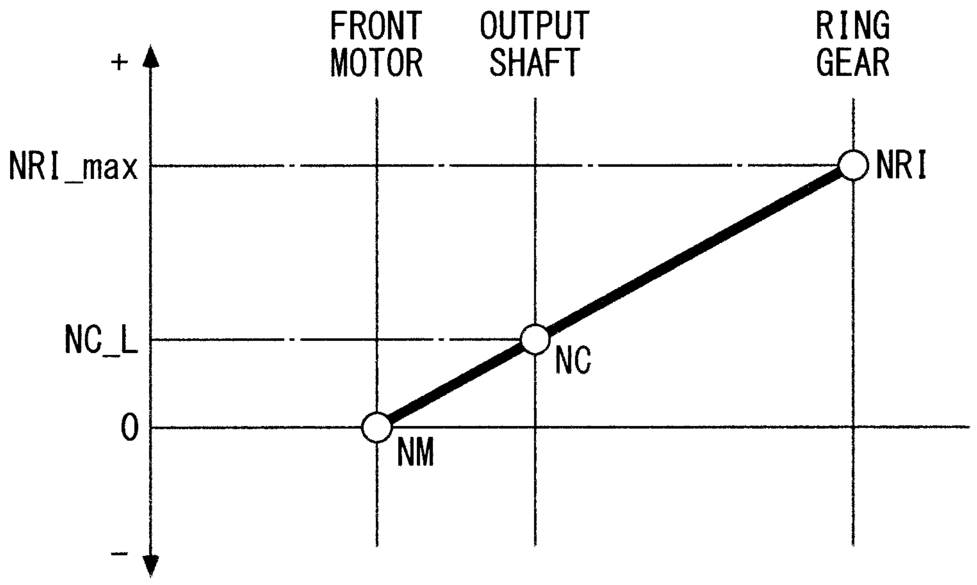
FIG. 10 is a collinear chart illustrating an example of the relationship between the motor rotational speed, the output rotational speed, and the ring gear speed, occurring immediately after a standing start of the vehicle, in the stopped state of the front motor.

In this case, since torque rises quickly in the rear motors 9 and 9, the vehicle V travels forward before the start of the in-gear operation, and the output rotational speed NC increases, which causes an increase in the ring gear speed NR1, under the condition of the front motor 4 being stopped (see FIG. 10).

As described above, even under a condition that an increase in the output rotational speed NC causes an increase in the ring gear speed NR1, the motor rotational speed NM can be controlled such that the ring gear speed NR1 is reduced in a speed range where NC≥NC_L holds, since the target rotational speed NMcmd is set according to the output rotational speed NC in the step 28, as described hereinabove.

On the other hand, within such a very low speed range as NC<NC_L holds, the output rotational speed NC is calculated as NC=0 due to the resolution of the output rotational speed sensor 60, as described above. Therefore, when the front motor 4 is held in the stopped state under a condition that NC<NC_L and NC≈NC_L hold, the ring gear speed NR1 takes its maximum value NR1 max, as shown in FIG. 10. In this case, there is a fear that load on the gear actuator 53 driving the first speed synchronization mechanism 18 is increased, and it takes time to perform the in-gear operation, and at worst, the in-gear operation fails.

Figure 11:
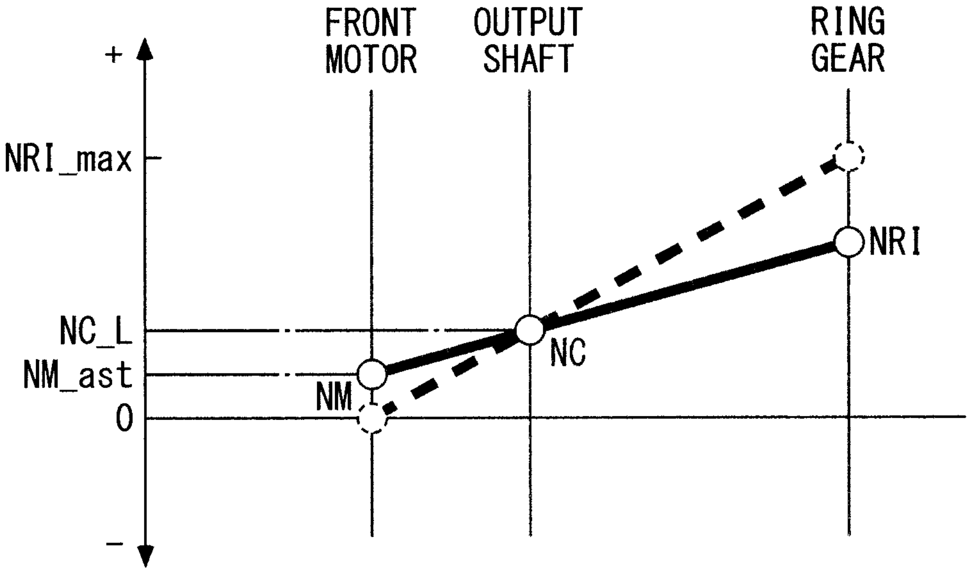
FIG. 11 is a collinear chart illustrating an example of the relationship between the motor rotational speed, the output rotational speed, and the ring gear speed, occurring when a first-speed in-gear assist control process of the front motor is performed immediately after a standing start of the vehicle.

To avoid this inconvenience, in the present embodiment, within such a very low speed range as NC<NC_L holds, the target rotational speed NMcmd is set to the predetermined synchronization assist value NM_ast, which is equal to one half of the detection lower limit value NC_L, in the step 27, so that the motor rotational speed NM is controlled such that it becomes equal to the predetermined synchronization assist value NM_ast. As a consequence, even under the condition that NC<NC_L and NC≈NC_L hold, the ring gear speed NR1 is made smaller than the maximum value NR1 max, as shown in FIG. 11, whereby compared with the case where the front motor 4 is held in the stopped state (case indicated by a broken line in FIG. 11), it is possible to reduce the load on the gear actuator 53 driving the first speed synchronization mechanism 18, whereby it is possible to quickly and positively execute the in-gear operation for switching the first-speed forward position to the in-gear state.

Figure 12:
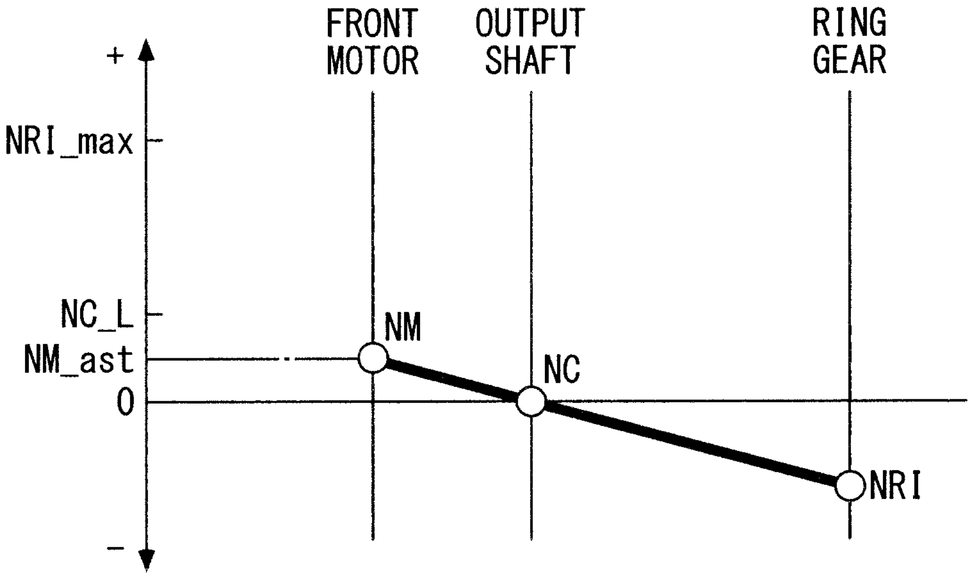
FIG. 12 is a collinear chart illustrating an example of the relationship between the motor rotational speed, the output rotational speed, and the ring gear speed, occurring when the first-speed in-gear assist control process of the front motor is performed in the stopped state of the vehicle.

Further, in the case where within the very low speed range where NC<NC_L holds, the motor rotational speed NM is controlled such that it becomes equal to the predetermined synchronization assist value NM_ast, even assuming that the charge level SOC is not high enough to drive the front motor 4, the rear motors 9 and 9 are held in the stopped state, and NC=0 holds, although the ring gear speed NR1 has a negative value (revere rotation), as shown in FIG. 12, the absolute value of the ring gear speed NR1 is made smaller than the maximum value NR1 max. As a consequence, compared with the case where the front motor 4 is held in the stopped state, it is possible to reduce the load on the gear actuator 53 driving the first speed synchronization mechanism 18, whereby it is possible to quickly and positively execute the in-gear operation for switching the first-speed forward position to the in-gear state. For the above reason, in the present embodiment, the above-described control method is employed.

As described above, according to the drive device 1 according to the present embodiment, in the transmission control process shown in FIG. 5, when all of the answers to the questions of the steps 6 to 8 become affirmative (YES), i.e. when a predetermined transmission condition that the motive power of the engine 3 should be transmitted to the front wheels FW and FW via the first-speed forward position is satisfied, the first speed synchronization mechanism 18 is controlled such that the first-speed forward position is switched to the in-gear state. Further, in the front motor control process shown in FIG. 6, if the above predetermined transmission condition is satisfied, and the charge level SOC is high enough to drive the front motor 4 (if the answer to the question of the step 25 is affirmative (YES)), when the output rotational speed NC≥NC_L holds, the target rotational speed NMcmd is calculated according to the output rotational speed NC and the first rotational speed N1. After that, the first-speed in-gear assist control process is performed, whereby the front motor 4 is controlled such that the motor rotational speed NM becomes equal to the target rotational speed NMcmd.

In this case, as described hereinabove, the motor rotational speed NM, the output rotational speed NC, and the ring gear speed NR1 are in the collinear relationship with each other, and are located on the same straight line, and hence by controlling the rotational speed of the front motor 4 as described above, it is possible to reduce the ring gear speed NR1, i.e. the rotational speed difference in the first speed synchronization mechanism 18. This makes it possible to quickly and smoothly execute the in-gear operation for switching the first-speed forward position on the first input shaft 11 having the front motor 4 connected thereto, to the in-gear state, while preventing the rotor of the front motor 4 from acting as an inertial resistance. In other words, it is possible to quickly and smoothly execute the in-gear operation without increasing the volume of the first speed synchronization mechanism 18 or increasing the size of the gear actuator 53 for driving the first speed synchronization mechanism 18. As a consequence, it is possible to improve the reliability of the in-gear operation for switching the first-speed forward position on the first input shaft 11 having the front motor 4 connected thereto, to the in-gear state, while ensuring the degree of freedom in design and realizing reduction of manufacturing costs thereof.

Further, in the case of the output rotational speed sensor 60 used in the present embodiment, the output rotational speed NC is calculated by the ECU 2 as 0 due to the resolution thereof within the very low speed range of NC<NC_L, so that as shown in FIG. 10, referred to hereinabove, when the in-gear operation for the first-speed forward position is executed, if the front motor 4 is held in the stopped state, the ring gear speed NR1 may be increased up to the maximum value NR1 max thereof. On the other hand, in the front motor control process shown in FIG. 6, when the output rotational speed NC is within the very low speed range of NC<NC_L, the target rotational speed NMcmd is set to the predetermined synchronization assist value NM_ast, which is equal to one half of the detection lower limit value NC_L, and the motor rotational speed NM is controlled such that it becomes equal to the predetermined synchronization assist value NM_ast. As a consequence, even under the condition that NC<NC_L and NC≈NC_L hold, the ring gear speed NR1 can be made smaller than the maximum value NR1 max, whereby compared with the case where the front motor 4 is held in the stopped state, it is possible to reduce the load on the gear actuator 53 driving the first speed synchronization mechanism 18, whereby it is possible to quickly and positively execute the in-gear operation for switching the first-speed forward position to the in-gear state.

Further, the in-gear operation for the first-speed forward position can be quickly and positively executed as described above, whereby when the vehicle V is started, it is possible to quickly start the vehicle V using not only the motive power of the rear motors 9 and 9 but also the motive power of the engine 3, thereby making it possible to enhance the marketability of the vehicle V.

Although in the present embodiment, the drive device for a vehicle, according to the present invention, is applied to an electric all-wheel drive vehicle, by way of example, this is not limitative, but it can be applied to a vehicle of a front-wheel-drive type or a vehicle of a rear-wheel-drive type.

For example, the drive device for a vehicle may be applied to a vehicle which is distinguished from the vehicle V in the above-described embodiment in that the rear motors 9 and 9 are omitted and the rear wheels RW and RW are idler wheels, that is, a front-wheel-drive vehicle. In this case, it is only required to perform the control processes shown in FIGS. 5 and 8, as they are, and perform a front motor control process shown in FIG. 13 in place of the front motor control process shown in FIG. 6.

Figure 13:
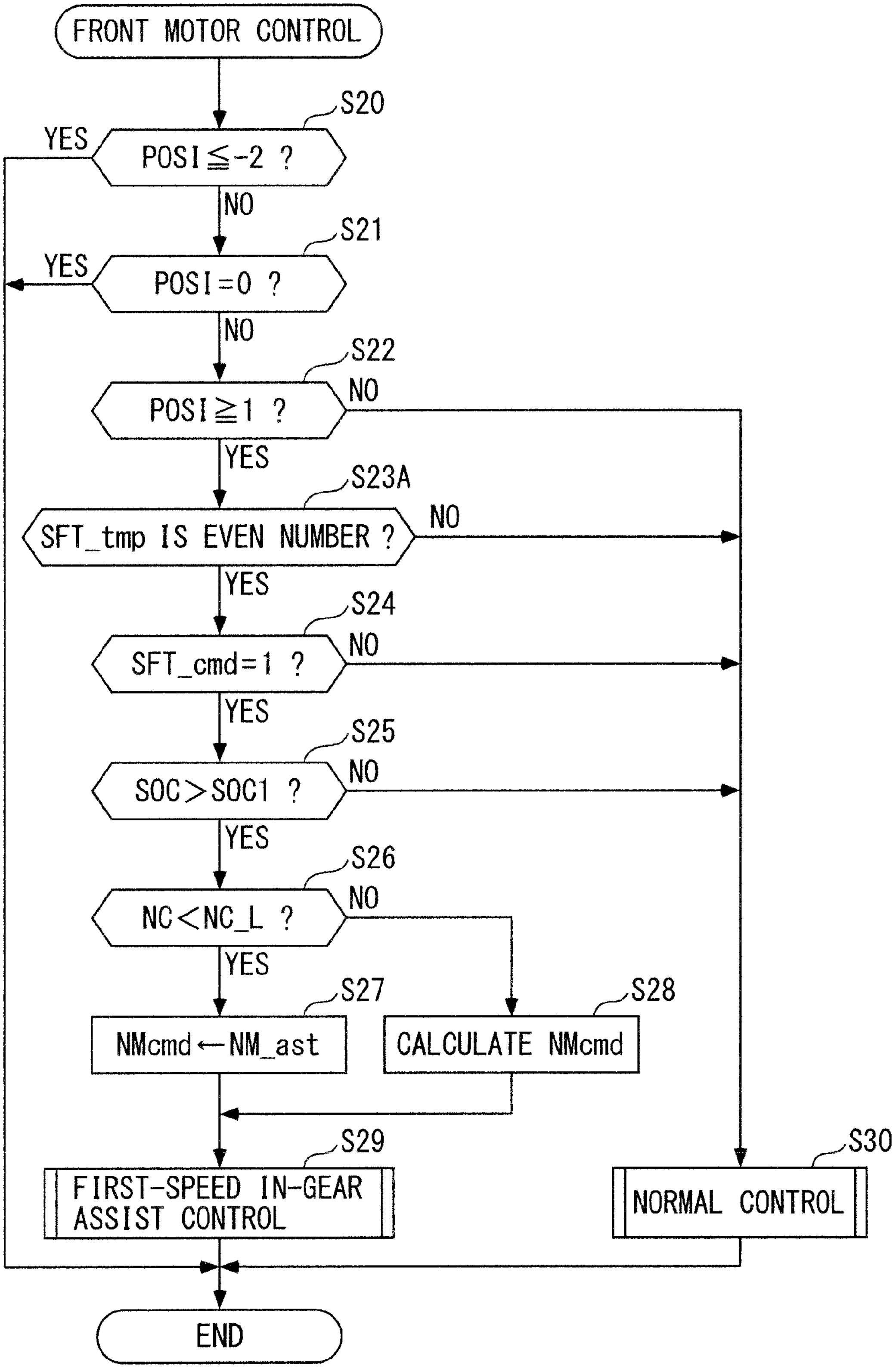
FIG. 13 is a flowchart of a front motor control process performed in a vehicle without a rear motor.

The control process shown in FIG. 13 is configured similarly to the control process shown in FIG. 6, except for a step 23A. In the step 23A, it is determined whether or not the current speed position value SFT_tmp is an even number. That is, it is determined which of the second-speed forward position, the fourth-speed forward position, and the sixth-speed forward position, the current speed position is. If the answer to this question is affirmative (YES), the above-described step 24 et seq. are executed, whereas if the answer to the question of the step 23A is negative (NO), i.e. if the current speed position is an odd-numbered speed position, the above-described step 30 is executed, followed by terminating the present process.

As described above, in a case where the front motor control process shown in FIG. 13 is performed, similarly to the above-described embodiment, it is possible to reduce the load on the gear actuator 53 driving the first speed synchronization mechanism 18, when the first-speed forward position is switched to the in-gear state (i.e. the first-speed forward position is pre-shifted) in a state in which the even-numbered speed forward position is switched to the in-gear state and the first clutch 5 is disengaged, whereby it is possible to quickly and positively execute the in-gear operation for the first-speed forward position.

In this case, in the front-wheel-drive vehicle, when the FIG. 13 control process is performed, the answer to the question of the step 26 becomes affirmative (YES), e.g. when the accelerator pedal is stepped on immediately before the vehicle V is stopped during deceleration traveling of the vehicle in the second-speed forward position, whereby the demanded torque TRQ is increased.

Further, although the present embodiment is an example in which the output rotational speed sensor 60 formed e.g. by the magnet rotor 60*a* and the MRE pickup 60*b* is used as the output rotational speed-detecting means, the output rotational speed-detecting means of the present invention is not limited to this, but any suitable output rotational speed-detecting means may be employed insofar as it includes a rotating body, a plurality of detected sections, and a detecting section, and is capable of detecting the rotational speed of the output shaft. For example, an electromagnetic pickup type sensor or a rotary encoder may be used as the output rotational speed-detecting means.

On the other hand, although the present embodiment is an example in which the first rotational speed sensor 61 is used as the first rotational speed-detecting means, the first rotational speed-detecting means of the present invention is not limited to this, but any suitable first rotational speed-detecting means may be employed insofar as it is capable of detecting the rotational speed of the first input shaft. For example, an electromagnetic pickup type sensor or a rotary encoder may be used as the first rotational speed-detecting means.

Further, although the present embodiment is an example in which the output rotational speed NC is used as a value representing the rotational speed of the output shaft, the value representing the rotational speed of the output shaft, in the present invention, is not limited to this, but any suitable value may be employed insofar as it represents the rotational speed of the output shaft, such as the vehicle speed VP.

Furthermore, although the present embodiment is an example in which the first-speed forward position is used as one first speed position, the one first speed position in the present invention is not limited to this, but any suitable speed position may be used insofar as it is any one of a plurality of first speed positions. For example, any one of the third-speed, fifth-speed, and seventh-speed forward positions may be used as the one first speed position.

On the other hand, although the present embodiment is an example in which the drive device for a vehicle, according to the present invention, is applied to a four-wheel vehicle, this is not limitative, but it can be applied to two-wheel or three-wheel vehicles, vehicles with six or more wheels, and caterpillar type vehicles.

Further, although the present embodiment is an example in which the front wheels FW and FW are used as driven parts, the driven parts according to the present invention are not limited to these, but any suitable driven parts maybe used insofar as they can transmit motive power from the output shaft. For example, rear wheels may be used as the driven parts of two-wheel to four-wheel vehicles. Furthermore, in a vehicle including a caterpillar, the caterpillar or starting wheels may be used as driven parts.

It is further understood by those skilled in the art that the foregoing are preferred embodiments of the invention, and that various changes and modifications may be made without departing from the spirit and scope thereof.

What is claimed is:

1. A drive device for a vehicle, comprising:

an internal combustion engine and an electric motor installed on a vehicle as motive power sources;

a first input shaft that is connected to said engine and said electric motor such that motive powers from said engine and said electric motor are transmitted thereto;

a first clutch that connects and disconnects between said engine and said first input shaft;

an output shaft that is connected to driven parts of the vehicle such that the motive powers can be transmitted to the driven parts;

a first transmission gear group that is provided between said first input shaft and said output shaft, and forms a plurality of first speed positions;

a first synchronizer that sets and unsets each of the plurality of first speed positions, by connecting two synchronization objects forming each of the plurality of first speed positions while synchronizing said two synchronization objects with each other, and releasing the connection between said two synchronization objects;

a second input shaft that is different from said first input shaft and is connected to said engine such that a motive power from the engine is input thereto;

a second transmission gear group that is provided between said second input shaft and said output shaft, and forms a plurality of second speed positions;

a second synchronizer that sets and unsets each of the plurality of second speed positions, by connecting two synchronization objects forming each of the plurality of second speed positions while synchronizing said two synchronization objects with each other, and releasing the connection between said two synchronization objects;

a second clutch that connects and disconnects between said engine and said second input shaft;

first rotational speed-detecting means for detecting a rotational speed of said first input shaft as a first rotational speed;

output rotational speed-detecting means for detecting a value indicative of a rotational speed of said output shaft as an output rotational speed;

transmission control means for controlling said first clutch, said first synchronizer, said second clutch, and said second synchronizer, and controlling said first synchronizer such that said two synchronization objects of one of the plurality of first speed positions are connected to each other when a predetermined transmission condition is satisfied which is a condition for transmitting the motive power of said engine to said driven parts via the one first speed position; and electric motor control means for controlling, in a case where the predetermined transmission condition is satisfied, if the detected output rotational speed is not within a predetermined very low speed range, a rotational speed of said electric motor based on the detected first rotational speed and the detected output rotational speed such that a rotational speed difference between said two synchronization objects synchronized by said first synchronizer is reduced, and controlling, in the case where the predetermined transmission condition is satisfied, if the detected output rotational speed is within the predetermined very low speed range, the rotational speed of said electric motor to a predetermined speed for suppressing the rotational speed difference between said two synchronization object.

2. The drive device according to claim 1, wherein said first transmission gear group forming the one first speed position includes a planetary gear unit, wherein said output shaft and said electric motor are connected to said planetary gear unit such that the output rotational speed is located between the rotational speed of said electric motor and the rotational speed difference in a collinear chart representing a collinear relationship, and wherein the predetermined speed is set to an intermediate value between a value defining an upper limit of the predetermined very low speed range of the output rotational speed and 0.

3. The drive device according to claim 1, wherein said output rotational speed-detecting means includes:

a rotating body rotating in unison with said output shaft;

a plurality of detected sections arranged at equally-spaced intervals on said rotating body; and a detecting section arranged in a vicinity of said rotating body, for detecting passing of each of said plurality of detected sections, wherein the predetermined very low speed range is set to a speed range in which the number of times of passing of each of said respective detected sections, detected by said detecting section, per predetermined unit time, is smaller than a predetermined value.

4. The drive device according to claim 1, wherein the one first speed position is set to a speed position for starting the vehicle.

5. The drive device according to claim 1, wherein the predetermined transmission condition is a condition that transmission of the motive power from the engine to said driven parts should be performed by switching from any one of the plurality of second speed positions to the one first speed position.

6. The drive device according to claim 1, wherein said driven parts are one of a set of front wheels and a set of rear wheels of the vehicle, wherein the one first speed position is set to a speed position for starting the vehicle, and wherein the predetermined transmission condition is that the speed position for starting the vehicle has been selected as a speed position with which the motive power of said engine should be transmitted, the drive device further comprising:

an other electric motor for driving the other of the set of front wheels and the set of rear wheels; and other electric motor control means for controlling said other electric motor such that the other set of wheels are driven at a standing start of the vehicle.

* * * * *